(12) United States Patent  
Lee et al.

(10) Patent No.: US 7,639,733 B1
(45) Date of Patent: Dec. 29, 2009

(54) MAXIMUM LIKELIHOOD ESTIMATION OF TIME AND FREQUENCY OFFSET FOR OFDM SYSTEMS

(75) Inventors: Jungwon Lee, Stanford, CA (US); Hui-Ling Lou, Palo Alto, CA (US); Dimitrios-Alexandros Toumpakaris, Sunnyvale, CA (US)

(73) Assignee: Marvell International Ltd., Hamilton (BM)

( * ) Notice: Subject to any disclaimer, the term of this patent is extended or adjusted under 35 U.S.C. 154(b) by 0 days.

(21) Appl. No.: 12/194,445

(22) Filed: Aug. 19, 2008

Related U.S. Application Data

(63) Continuation of application No. 11/026,543, filed on Dec. 30, 2004, now Pat. No. 7,421,013.

(60) Provisional application No. 60/598,585, filed on Aug. 2, 2004.

(51) Int. Cl.
*H04L 27/30* (2006.01)

(52) U.S. Cl. ........................ 375/149; 375/150; 375/344; 370/252; 370/316; 370/512

(58) Field of Classification Search ................. 375/150, 375/260, 262, 340–342, 344, 346, 348, 354; 370/203, 252, 295, 316, 330, 344, 436, 437, 370/464, 480, 482, 510, 512; 455/192.2, 455/214
See application file for complete search history.

(56) References Cited

U.S. PATENT DOCUMENTS

| | | | |
|---|---|---|---|
| 6,922,388 | B1 | 7/2005 | Laroia et al. |
| 7,423,959 | B2 * | 9/2008 | Gavillero Martin et al. . 370/208 |
| 2004/0105512 | A1 * | 6/2004 | Priotti |
| 2004/0184551 | A1 * | 9/2004 | Liu et al. |
| 2004/0190638 | A1 | 9/2004 | Blasco Claret et al. |
| 2005/0251844 | A1 | 11/2005 | Martone et al. |
| 2006/0018413 | A1 | 1/2006 | Gupta |

OTHER PUBLICATIONS

Beck et al.., "ML Estimation of Time and Frequency Offset in OFDM Systems", IEEE Transactions on Signal Processing, vol. 45, No. 7, Jul. 1997, pp. 1800-1805.

(Continued)

*Primary Examiner*—Dac V Ha

(57) ABSTRACT

A receiver in an OFDM system may include a joint maximum likelihood (ML) estimator that estimates both time offset and frequency offset. The estimator may use samples in an observation window to estimate the time offset and frequency offset.

20 Claims, 4 Drawing Sheets

OTHER PUBLICATIONS

Pollet, et al., "BER Sensitivity of OFDM Systems to Carrier Frequency Offset and Wiener Phase Noise", IEEE Transactions on Communications, vol. 43, No. 2/3/4, Feb./Mar./Apr. 1995, pp. 191-193.

Schmidl et al., "Robust Frequency and Timing Synchronization for OFDM", IEEE Transactions on Communications, vol. 45, No. 12, Dec. 1997, pp. 1613-1621.

Wei et al., "Synchronization Requirements for Multi-user OFDM on Satellite Mobile and Two-path Rayleigh Fading Channels", IEEE Transactions on Communications, vol. 43, No. 2/3/4, Feb./Mar./Apr. 1995, pp. 887-895.

Zou et al., "COFDM: An Overview", IEEE Transactions on Broadcasting, vol. 41, No. 1, Mar. 1995, pp. 1-8.

"Information technology—Telecommunications and information exchange between systems—Local and metropolitan area networks—Specific requirements- Part 11: Wireless LAN Medium Access Control (MAC) and Physical Layer (PHY) specifications", ANSI/IEEE Std 802.11, 1999.

"Part 11: Wireless LAN Medium Access Control (MAC) and Physical Layer (PHY) specifications: Higher-Speed Physical Layer Extension in the 5 GHz Band", IEEE Std 802.11a-1999.

"Part 11: Wireless LAN Medium Access Control (MAC) and Physical Layer (PHY) specifications: Higher-Speed Physical Layer Extension in the 2.4 GHz Band", IEEE Std 802.11b-1999.

"Draft Supplement to Standard [for] Information Technology—Telecommunications and information exchange between systems—Local and metropolitan area networks-Specific requirements—Part 11: Wireless LAN Medium Access Control (MAC) and Physical Layer (PHY) specifications: Further Higher Data Rate Extension in the 2.4 GHz Band", IEEE 802.11g/D8.2, Apr. 2003.

* cited by examiner

MAXIMUM LIKELIHOOD ESTIMATION OF TIME AND FREQUENCY OFFSET FOR OFDM SYSTEMS

CROSS-REFERENCE TO RELATED APPLICATIONS

The present application is a continuation of, and claims priority to, U.S. patent application Ser. No. 11/026,543, filed Dec. 30, 2004, which claims priority to U.S. Provisional Patent Application No. 60/598,585, filed on Aug. 2, 2004. The disclosures of the above applications are incorporated herein by reference in their entirety.

BACKGROUND

Wireless systems may use an Orthogonal Frequency Division Multiplexing (OFDM) transmission scheme. In an OFDM system, a data stream is split into multiple substreams, each of which is sent over a subcarrier frequency. Because data is carried over multiple carrier frequencies, OFDM systems are referred to as "multicarrier" systems as opposed to single carrier systems in which data is transmitted on one carrier frequency.

An advantage of OFDM systems over single carrier systems is their ability to efficiently transmit data over frequency selective channels by employing a fast Fourier transform (FFT) algorithm instead of the complex equalizers typically used by single carrier receivers. This feature enables OFDM receivers to use a relatively simple channel equalization method, which is essentially a one-tap multiplier for each tone.

Despite these advantages, OFDM systems may be more sensitive to time offset than single carrier systems. Also, demodulation of a signal with an offset in the carrier frequency can cause a high bit error rate and may degrade the performance of a symbol synchronizer in an OFDM system.

SUMMARY

A receiver in an Orthogonal Frequency Division Multiplexing (OFDM) system may include a joint maximum likelihood (ML) estimator that estimates both time offset and frequency offset. The estimator may use samples in an observation window to estimate the time offset and frequency offset. The size of the observation window may be selected to correspond to a desired performance level of the estimator, with larger window sizes providing better accuracy.

The estimator may include a receiver to receive a number of symbols, each symbol including a body samples and cyclic prefix samples, a frame circuit to observe a plurality of samples in the window, and a calculator to calculate a correction value based on a number of correlated cyclic prefix samples and body samples in the window and to calculate an estimated time offset value using samples in the window and the correction value.

The estimator may calculate the estimated time offset value $\hat{\theta}$ by solving the equation:

$$\hat{\theta} = \underset{0 \le m \le N_t-1}{\operatorname{argmax}} \{|\gamma(m)| - \rho\Phi(m) - \Psi(m)\},$$

where $$\gamma(m) = \sum_{n \in A_m \cap I} y[n] y^*[n+N],$$

$$\Phi(m) = \frac{1}{2} \sum_{n \in A_m \cap I} (|y[n]|^2 + |y[n+N]|^2),$$

-continued $$\Psi(m) = |A_m \cap I| \frac{2\rho}{(\sigma_x^2 + \sigma_z^2)(1-\rho^2)} \log(1-\rho^2),$$

$$\rho = \frac{\sigma_x^2}{\sigma_x^2 + \sigma_z^2},$$

$$A_m = \bigcup_{i=-\infty}^{\infty} \{m + iN_t, \ldots, (N_g - 1) + m + iN_t\},$$

$$I = \{0, \ldots, M - N - 1\},$$

where $y[n]$ is a received sample with index n, N is the number of samples in the body of a symbol, $N_g$ is the number of samples in the cyclic prefix of a symbol, $N_t$ is the total number of samples in a symbol, M is the number of samples in the window, $\sigma_x^2$ is the variance of a transmit signal, $\sigma_z^2$ is the variance of the white Gaussian noise, and $\Psi(m)$ is the correction value.

The estimator may calculate the estimated frequency offset value $\hat{\epsilon}$ by solving the following equation:

$$\hat{\epsilon} = -\frac{1}{2\pi} < \gamma(\hat{\theta}).$$

DETAILED DESCRIPTION

Figure 1:
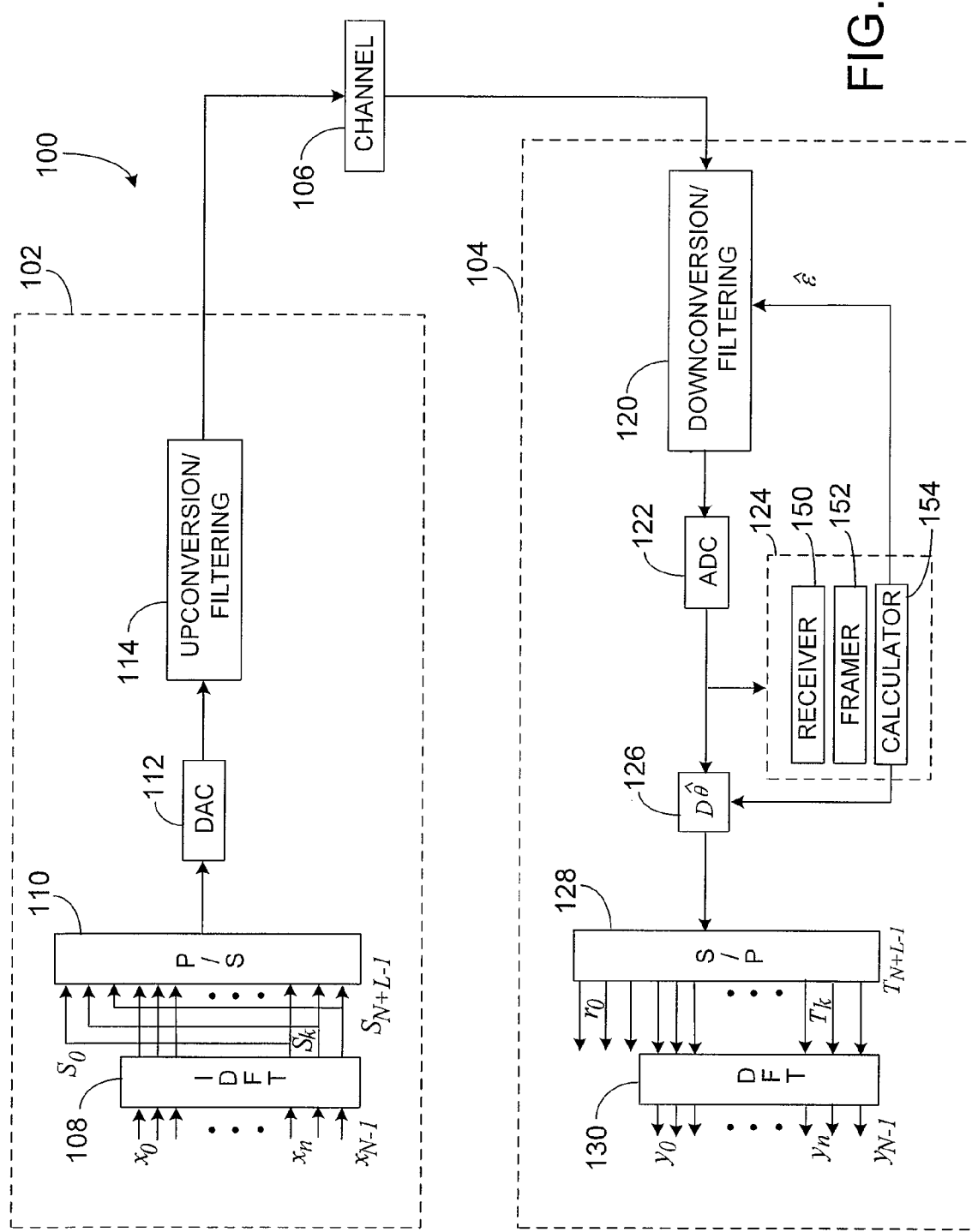
FIG. 1 is a block diagram of a wireless system according to an embodiment.

FIG. 1 shows a wireless communication system 100 according to an embodiment. The wireless communication system includes a transmitter 102 and a receiver 104 that communicate over a wireless channel 106. The transmitter 102 and receiver 104 may be implemented in two different transceivers, each transceiver including both a transmitter section and a receiver section.

The wireless communication system 100 may be implemented in a wireless local Area Network (WLAN) that complies with the IEEE 802.11 standards (including IEEE 802.11, 802.11a, 802.11b, 802.11g, and 802.11n). The IEEE 802.11 standards describe OFDM systems and the protocols used by such systems. In an OFDM system, a data stream is split into multiple substreams, each of which is sent over a different subcarrier frequency (also referred to as a "tone"). For example, in IEEE 802.11a systems, OFDM symbols include 64 tones (with 48 active data tones) indexed as {-32, -31, ..., -1, 0, 1, ..., 30, 31}, where 0 is the DC tone index. The DC tone is not used to transmit information.

At the transmitter 102, N complex data symbols are transformed to time-domain samples by an inverse discrete Fourier transform (IDFT) module 108. A cyclic prefix may be added to the body of the OFDM symbol to avoid interference (ISI) and preserve orthogonality between subcarriers. The cyclic prefix may include copies of the last $N_g$ samples of the N time-domain samples. The cyclic prefix is appended as a preamble to the N time-domain samples to form the complete OFDM symbol with $N_t=N_g+N$ samples.

The OFDM symbols are converted to a single data stream by a parallel-to-serial (P/S) converter 110 and concatenated serially. The discrete symbols are converted to analog signals by a digital-to-analog converter (DAC) 112 and lowpass filtered for radio frequency (RF) upconversion by an RF module 114. The OFDM symbols are transmitted over the wireless channel 106 to the receiver 104, which performs the inverse process of the transmitter 102.

At the receiver 104, the received signals are down converted and filtered by an RF module 120 and converted to a digital data stream by an analog-to-digital converter (ADC) 122. A joint frequency offset and time offset estimator 124 may be used for frequency and symbol synchronization. The estimator 124 may include a receiver 150 to receive samples from the ADC 122, a framer 152 to observe a window of samples of the received OFDM symbols, and a calculator 154 to estimate the carrier frequency offset $\epsilon$ and time offset $\theta$. The estimated frequency offset $\hat{\epsilon}$ may be fed back to the downconverter 120 to correct carrier frequency and the estimated time offset $\hat{\theta}$ may be fed to an FFT window alignment module 126 to enable the alignment module to determine the boundary of the OFDM symbols for proper FFT demodulation. The estimated frequency offset can be used to correct the carrier frequency in the digital domain. The data stream is then converted into parallel substreams by a serial-to-parallel (S/P) converter 128 and transformed into N tones by a DFT module 130.

For the additive white Gaussian noise (AWGN) channel, the received signal y[n] with time offset $\theta$ and frequency offset $\epsilon$ can expressed as $$y[n]=x[n-\theta]e^{j2\pi\epsilon n/N}+z[n] \quad (1)$$

where x[n] and z[n] are the transmit signal with variance $\sigma_x^2$ and white Gaussian noise with variance $\sigma_z^2$, respectively. When N is large, the transmit signal can be regarded as a Gaussian process. Since the transmit signal is independent from the noise, the received signal can be modeled as a Gaussian process with the following autocorrelation properties:

$$E[y[n]y^*[n+m]] = \begin{cases} (\sigma_x^2+\sigma_z^2)\delta[m]+\sigma_x^2 e^{-j2\pi\epsilon}\delta[m-N], & m \in A_\theta \\ (\sigma_x^2+\sigma_z^2)\delta[m]+\sigma_x^2 e^{j2\pi\epsilon}\delta[m+N], & m \in B_\theta \\ (\sigma_x^2+\sigma_z^2)\delta[m], & \text{otherwise} \end{cases} \quad (2)$$

$$\delta[m] = \begin{cases} 1 & m=0 \\ 0 & \text{otherwise} \end{cases}, \quad (3)$$

$$A_k = \bigcup_{i=-\infty}^{\infty} \{k+iN_t, \ldots, (N_g-1)+k+iN_t\}, \text{ and} \quad (4)$$

$$B_k = \bigcup_{i=-\infty}^{\infty} \{N+k+iN_t, \ldots, (N_t-1)+k+iN_t\}, \quad (5)$$

where $N_t=N_g+N$, as described above.

The sets $A_\theta$ and $B_\theta$ contain the indices of the cyclic prefix samples and the useful samples that are duplicated in the cyclic prefix, respectively.

Figure 2A:
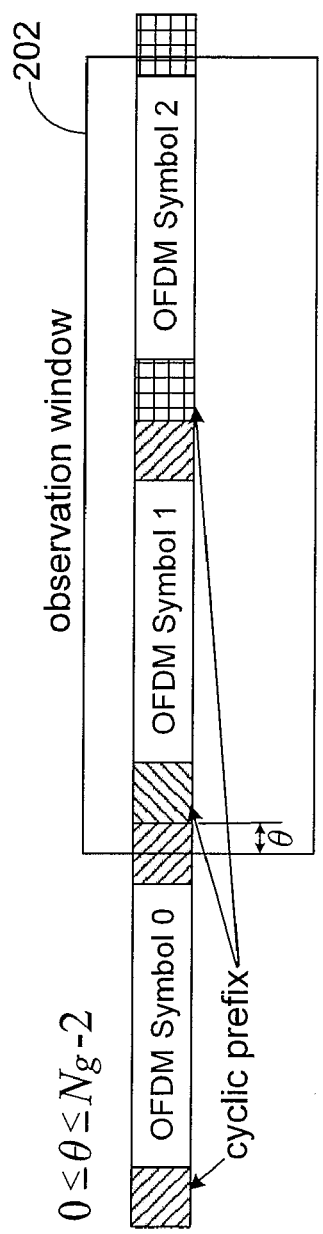
FIGS. 2A-C illustrate observation windows for OFDM symbols with different time offsets.
Figure 2B:
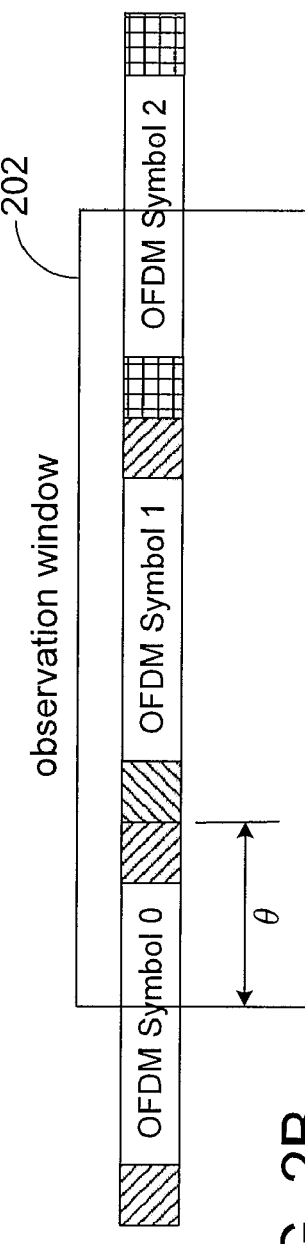
Figure 2C:
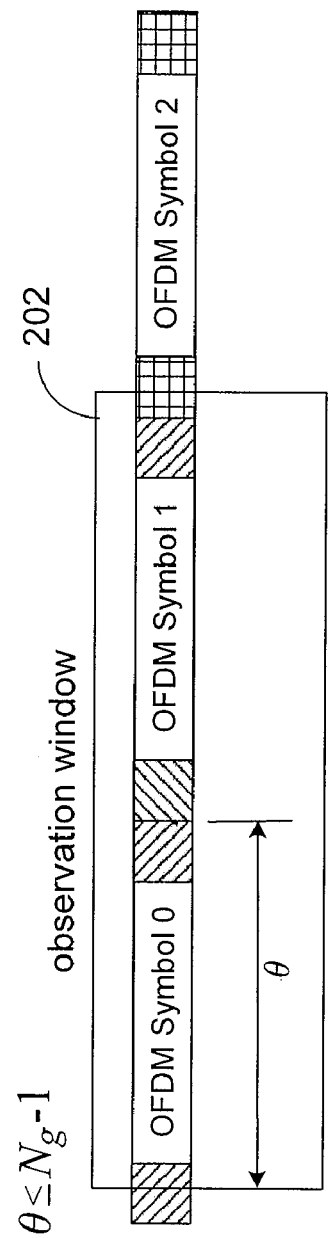

The estimator 124 may be a maximum likelihood (ML) estimator. ML estimators may be "blind" estimators, i.e., they do not require training symbols or pilots, but rather exploit the fact that the cyclic prefix samples are duplicates of part of the useful data samples in the OFDM symbol. As is shown in FIGS. 2A-C, for an observation window 202 of $2N_t-1$ samples, depending on the time offset $\theta$, the observation window contains a varying number of cyclic prefix samples whose correlated useful samples are also inside the observation window.

In an embodiment, the estimator 124 may exploit all correlated samples in the observation window. Also, the joint ML estimator may not be limited to an observation window of $2N_t-1$, but may be performed for a range of observation window sizes, trading off precision for larger observation windows with estimation speed for smaller observation windows.

Figure 3:
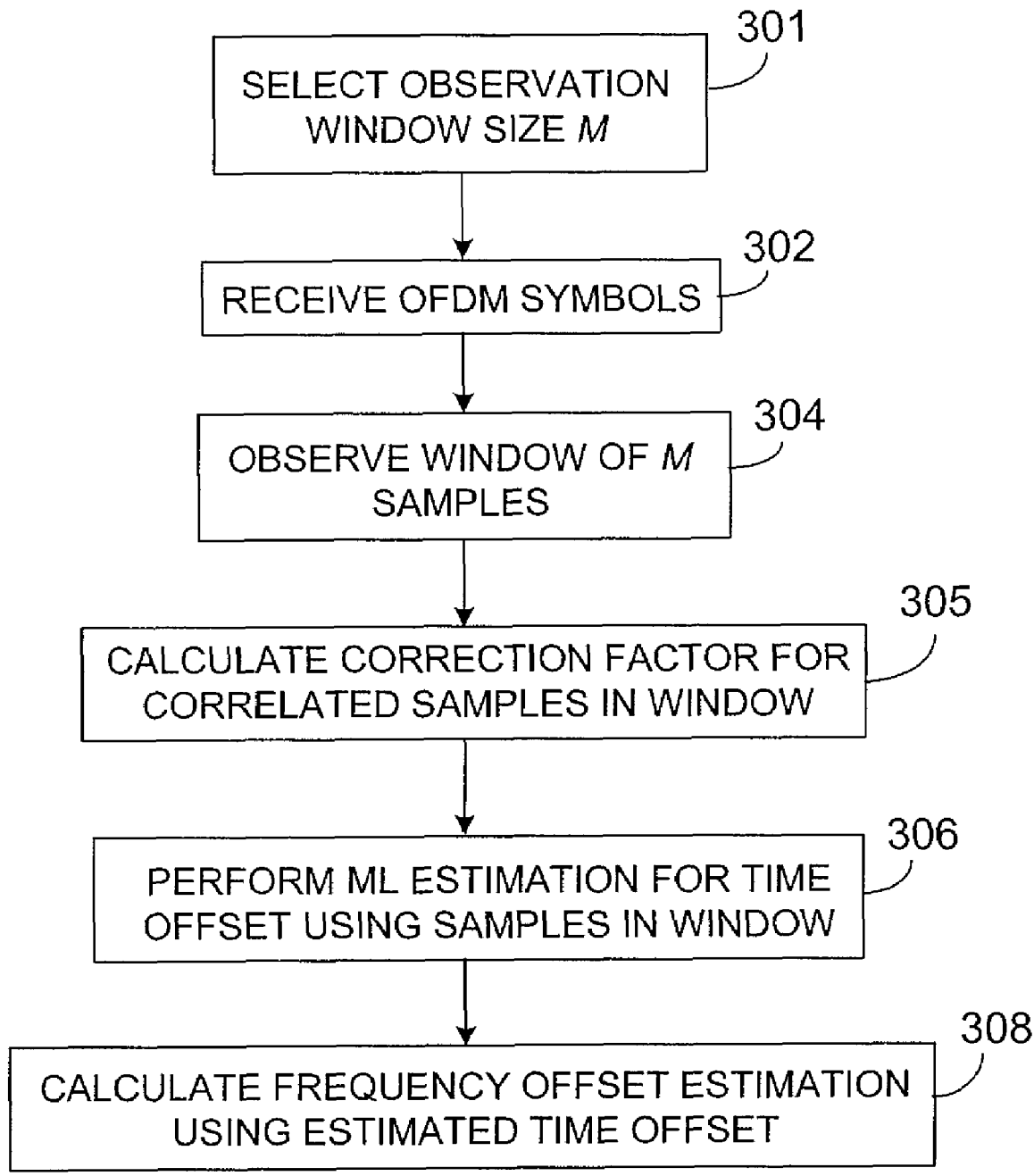
FIG. 3 is a flowchart describing a joint time offset and carrier frequency offset maximum likelihood (ML) estimation operation according to an embodiment.

FIG. 3 is a flowchart describing a joint time offset and frequency offset ML estimation operation according to an embodiment. A window size M may be selected (block 301). The estimator 124 receives OFDM symbols from the ADC 122 (block 302) and observes samples in a window having a defined size (block 304).

The estimator 124 calculates a correction value based on the number of correlated cyclic prefix samples and useful samples in the window (block 305), described below in Eq. (11), and performs an ML estimation using samples in the observation window and the correction factor (block 306).

For a given observation window size M, the received samples with index $n \in A_\theta \cap I$ (where $I=\{0,\ldots,M-N-1\}$) are the only cyclic prefix samples whose correlated useful samples are also inside the observation window. The estimator then uses the time offset estimation value to calculate the frequency offset estimation value (block 308).

The time offset estimation and frequency offset estimation are given in Eqs. (7) and (8) below and are derived as follows. For ML estimation, one should choose the time offset estimate m and frequency offset $\lambda$ that maximize $$\log\left(f(y[0],\ldots,y[M-1]\mid m,\lambda)\right) = \log\left(\prod_{n\in A_m\cap I} f(y[n],y[n+N]\mid m,\lambda) \prod_{n\notin(A_m\cup B_m)\cap I} f(y[n]\mid m,\lambda)\right) \quad (6)$$

$$= \log\left(\prod_{n\in A_m\cap I} \frac{f(y[n],y[n+N]\mid m,\lambda)}{f(y[n]\mid m,\lambda)f(y[n+N]\mid m,\lambda)} \prod_n f(y[n]\mid m,\lambda)\right),$$

$$= \sum_{n\in A_m\cap I} \log\left(\frac{f(y[n],y[n+N]\mid m,\lambda)}{f(y[n]\mid m,\lambda)f(y[n+N]\mid m,\lambda)}\right) + C$$

where C is a constant that does not depend on m and λ, and $f(\cdot|m,\lambda)$ denotes the conditional probability density function (pdf) of the variables in its argument given m and λ. The conditional pdf $f(\cdot|m,\lambda)$ can be derived from Eq. (2).

By inserting the conditional pdf in Eq. (6) and manipulating Eq. (6) algebraically, the following time and frequency offset estimators can be obtained:

$$\hat{\theta} = \underset{0 \leq m \leq N_t - 1}{\text{argmax}} \{|\gamma(m)| - \rho \Phi(m) - \Psi(m)\}, \quad (7)$$

$$\hat{\varepsilon} = -\frac{1}{2\pi} \angle \gamma(\hat{\theta}), \quad (8)$$

where $$\gamma(m) = \sum_{n \in A_m \cap I} y[n] y^*[n+N], \quad (9)$$

$$\Phi(m) = \frac{1}{2} \sum_{n \in A_m \cap I} (|y[n]|^2 + |y[n+N]|^2), \quad (10)$$

$$\Psi(m) = |A_m \cap I| \frac{2\rho}{(\sigma_x^2 + \sigma_z^2)(1-\rho^2)} \log(1-\rho^2), \quad (11)$$

$$\rho = \frac{\sigma_x^2}{\sigma_x^2 + \sigma_z^2}, \quad (12)$$

where $|A_m \cap I|$ is the number of elements in the set $A_m \cap I$.

The term $\Psi(m)$ is used as a correction factor to account for the fact that for a given observation window, the number of cyclic prefix samples with correlated useful samples in the window depends on the position of the cyclic prefix samples in the observation window, except for the special case of $N_t + N$, where there are always $N_g$ correlated samples.

It can be shown that ρ and $\Psi(m)$ converge to one and zero, respectively, as the SNR increases. Accordingly, for very high SNR, the ML estimator may be simplified by taking the autocorrelation (Eq. (9)) of the received signal for $0 \leq m \leq N_t - 1$ and normalizing it by subtracting the energy given in Eq. (10).

Figure 4:
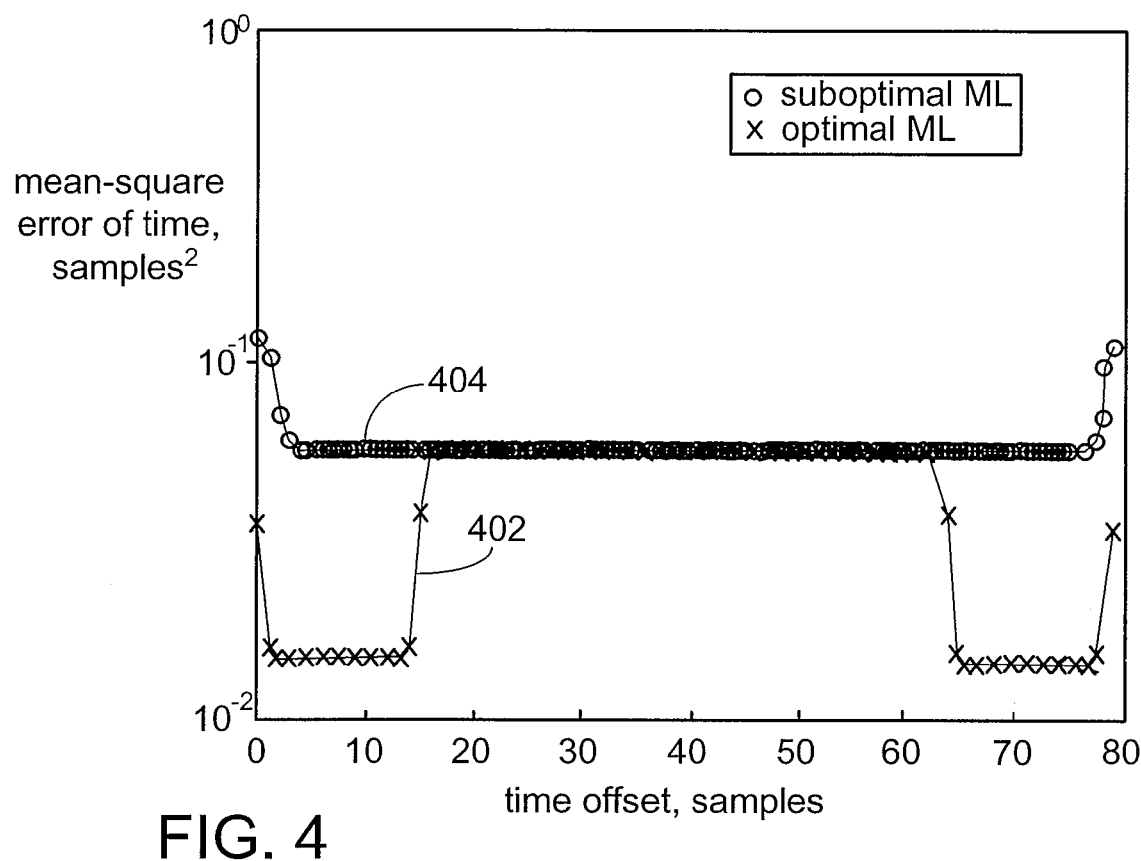
FIG. 4 is a plot showing the mean square error performance of two types of joint ML estimators as a function of time offset.
Figure 5:
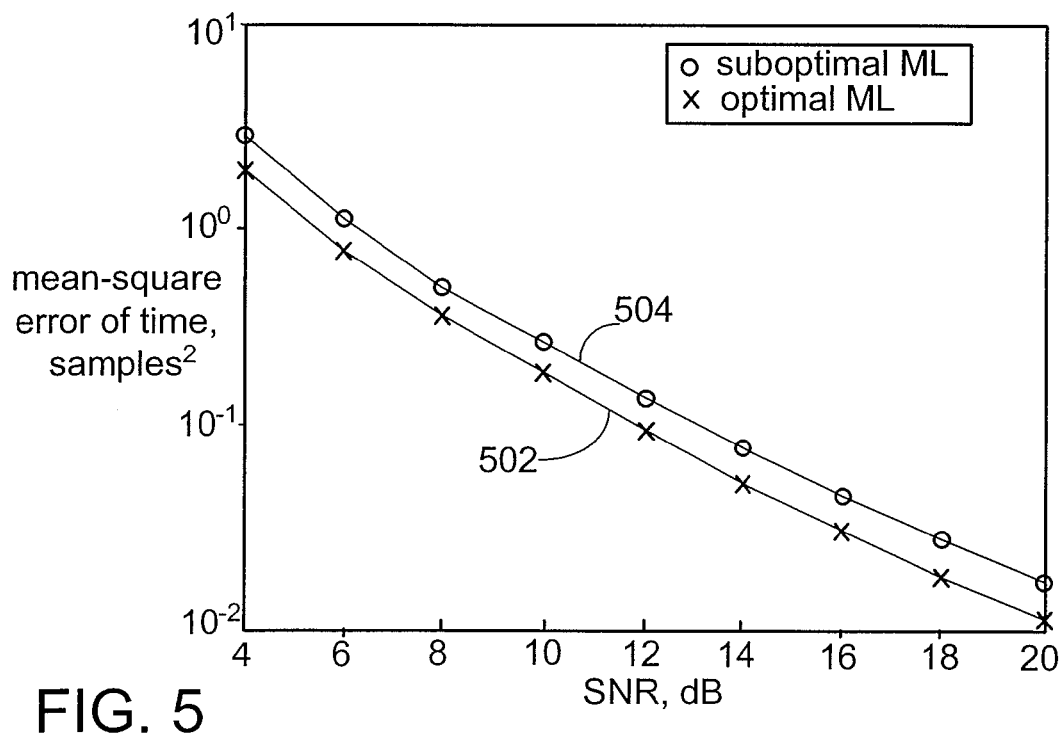
FIG. 5 is a plot showing the mean square error performance of the two joint ML estimators for varying signal-to-noise ration (SNR).

FIGS. 4 and 5 show the performance of a joint ML estimator according to an embodiment compared to a suboptimal joint ML estimator for an observation window size M of $2N_t - 1$ samples. For the suboptimal ML estimator, it is assumed that a receiver observes $N_t + N$ consecutive samples. For the suboptimal estimator, the time offset estimate $\hat{\theta}$ and frequency offset estimate $\hat{\varepsilon}$ are given by $$\hat{\theta} = \underset{0 \leq m \leq N_t - 1}{\text{argmax}} \{|\gamma(m)| - \rho \Phi(m)\}, \quad (13)$$

$$\hat{\varepsilon} = -\frac{1}{2\pi} \angle \gamma(\hat{\theta}), \quad (14)$$

where $$\gamma(m) = \sum_{n=m}^{m+N_g-1} y[n] y^*[n+N], \text{ and} \quad (15)$$

$$\Phi(m) = \frac{1}{2} \sum_{n=m}^{m+N_g-1} (|y[n]|^2 + |y[n+N]|^2), \quad (16)$$

where ρ is given above in Eq. (12).

Although this estimator was derived with the assumption that a receiver observes only $N_t + N$ samples, it requires the observation of $2N_t - 1$ consecutive samples for proper operation, as can be seen from Eqs. (13), (15), and (16).

FIG. 4 shows the mean-square error performance 402, 404 as a function of the time offset θ for an ML estimator using the time offset estimator in Eq. (7) and the suboptimal ML estimator, respectively. In this example, $N_g = 16$ and $N = 64$. As can be seen from the figure, the use of the optimal ML estimator results in smaller mean-square error when the time offset is within the interval $[0, N_g - 1]$ and $[N+1, N_t]$. This occurs because the observation window contains more than $N_g$ correlated values for the time offset in $[0, N_g - 1]$ and $[N+1, N_t]$. The performance of the frequency offset estimator exhibits similar trends.

FIG. 5 shows the mean-square error performance 502, 504 of an ML estimator using Eq. (7) and the suboptimal ML estimator, respectively, for varying SNR assuming that the time offset is uniformly distributed over $[0, N_t - 1]$. As can be seen from the plot, the ML estimator using Eq. (7) requires approximately 1 dB to 2 dB less SNR than the suboptimal ML estimator to achieve the same performance.

A number of embodiments have been described. Nevertheless, it will be understood that various modifications may be made without departing from the spirit and scope of the invention. For example, blocks in the flowchart may be skipped or performed out of order and still produce desirable results. Accordingly, other embodiments are within the scope of the following claims.

The invention claimed is:

1. A method comprising:
   receiving a signal comprising at least one symbol, the symbol including a plurality of cyclic prefix samples;
   observing a plurality of samples in a window;
   calculating, by an estimator, a correction value so that the correction value is proportional to a number of correlated cyclic prefix samples in the window, each of the correlated cyclic prefix samples being a cyclic prefix sample in the window that is correlated with a different sample in the window; and
   calculating, by the estimator, an estimated time offset value using the observed samples in the window and the correction value.

2. The method of claim 1, wherein the calculating the estimated time offset comprises performing a maximum likelihood estimation operation.

3. The method of claim 2, wherein the performing the maximum likelihood estimation operation comprises subtracting the correction value, wherein the subtracting accounts for the number of correlated cyclic prefix samples in the window.

4. The method of claim 1, wherein the correction value is further proportional to a mathematical expression that comprises variance of a transmit signal and variance of white Gaussian noise thereof.

5. The method of claim 1, further comprising:
   operating a receiver to receive the signal; and
   increasing sensitivity of the receiver using the correction value.

6. The method of claim 1, wherein the signal comprises at least a portion of one or more Orthogonal Frequency Division Multiplexing (OFDM) symbols.

7. The method of claim 1, further comprising selecting a number of the observed samples in the window, said number of the samples corresponding to an accuracy of the estimated time offset value.

8. The method of claim 1, further comprising using the estimated time offset value to calculate an estimated frequency offset value.

9. The method of claim 1, wherein said calculating the estimated time offset value $\hat{\theta}$ comprises solving the equation:

$$\hat{\theta} = \underset{0 \leq m \leq N_t - 1}{\operatorname{argmax}} \{|\gamma(m)| - \rho \Phi(m) - \Psi(m)\},$$

where $$\gamma(m) = \sum_{n \in A_m \cap I} y[n] y^*[n+N],$$

$$\Phi(m) = \frac{1}{2} \sum_{n \in A_m \cap I} (|y[n]|^2 + |y[n+N]|^2),$$

$$\Psi(m) = |A_m \cap I| \frac{2\rho}{(\sigma_x^2 + \sigma_z^2)(1-\rho^2)} \log(1-\rho^2),$$

$$\rho = \frac{\sigma_x^2}{\sigma_x^2 + \sigma_z^2},$$

$$A_m = \bigcup_{i=-\infty}^{\infty} \{m + iN_t, \ldots, (N_g - 1) + m + iN_t\},$$

$$I = \{0, \ldots, M - N - 1\},$$

where y[n] is a received sample with index n, N is a number of samples in a body of the symbol, $N_g$ is a number of the cyclic prefix samples in the symbol, $N_t$ is a total number of samples in the symbol, M is a number of the observed samples in the window, $\sigma_x^2$ is the variance of a transmit signal, $\sigma_z^2$ is the variance of the white Gaussian noise, and $\Psi(m)$ is the correction value for at least one value m.

10. The method of claim 9, further comprising calculating an estimated frequency offset value $\hat{\epsilon}$ based on an equation $$\hat{\epsilon} = -\frac{1}{2\pi} \angle \gamma(\hat{\theta}).$$

11. An apparatus comprising:
a receiver to receive a signal comprising at least one symbol, the symbol including a plurality cyclic prefix samples;
a frame circuit to observe a plurality of samples in a window; and
a calculator configured to perform operations comprising:
calculating a correction value so that the correction value is proportional to a number of correlated cyclic prefix samples in the window, each of the correlated cyclic prefix samples being a cyclic prefix sample in the window that is correlated with a different sample in the window; and
calculating an estimated time offset value using the observed samples in the window and the correction value.

12. The apparatus of claim 11, wherein the calculating the estimated time offset comprises performing a maximum likelihood estimation operation.

13. The apparatus of claim 12, wherein the performing the maximum likelihood estimation operation comprises subtracting the correction value, wherein the subtracting accounts for the number of correlated cyclic prefix samples in the window.

14. The apparatus of claim 11, wherein the correction value is further proportional to a mathematical expression that comprises variance of a transmit signal and variance of white Gaussian noise thereof.

15. The apparatus of claim 11, wherein the calculator is operatively coupled with the receiver, wherein the correction value increases sensitivity of the receiver.

16. The apparatus of claim 11, wherein the signal comprises at least a portion of one or more Orthogonal Frequency Division Multiplexing (OFDM) symbols.

17. The apparatus of claim 11, wherein the operations further comprise selecting a number of the observed samples in the window, said number of the samples corresponding to an accuracy of the estimated time offset value.

18. The apparatus of claim 11, wherein the operations further comprise using the estimated time offset value to calculate an estimated frequency offset value.

19. The apparatus of claim 11, wherein said calculating the estimated time offset value $\hat{\theta}$ comprises solving the equation:

$$\hat{\theta} = \underset{0 \leq m \leq N_t - 1}{\operatorname{argmax}} \{|\gamma(m)| - \rho \Phi(m) - \Psi(m)\},$$

where $$\gamma(m) = \sum_{n \in A_m \cap I} y[n] y^*[n+N],$$

$$\Phi(m) = \frac{1}{2} \sum_{n \in A_m \cap I} (|y[n]|^2 + |y[n+N]|^2),$$

$$\Psi(m) = |A_m \cap I| \frac{2\rho}{(\sigma_x^2 + \sigma_z^2)(1-\rho^2)} \log(1-\rho^2),$$

$$\rho = \frac{\sigma_x^2}{\sigma_x^2 + \sigma_z^2},$$

$$A_m = \bigcup_{i=-\infty}^{\infty} \{m + iN_t, \ldots, (N_g - 1) + m + iN_t\},$$

$$I = \{0, \ldots, M - N - 1\},$$

where y[n] is a received sample with index n, N is a number of samples in a body of the symbol, $N_g$ is a number of the cyclic prefix samples in the symbol, $N_t$ is a total number of samples in the symbol, M is a number of the observed samples in the window, $\sigma_x^2$ is the variance of a transmit signal, $\sigma_z^2$ is the variance of the white Gaussian noise, and $\Psi(m)$ is the correction value for at least one value m.

20. The apparatus of claim 19, wherein the operations further comprise calculating an estimated frequency offset value $\hat{\epsilon}$ based on an equation $$\hat{\epsilon} = -\frac{1}{2\pi} \angle \gamma(\hat{\theta}).$$

* * * * *